(12) United States Patent
Hedman

(10) Patent No.: US 6,496,180 B1
(45) Date of Patent: Dec. 17, 2002

(54) MOUSE WITH SLIDER CONTROL FOR COMPUTER SCROLLING

(75) Inventor: Michael Hedman, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/386,311

(22) Filed: Aug. 31, 1999

(51) Int. Cl.[7] .................................. G09G 5/08
(52) U.S. Cl. ...................... 345/166; 345/163
(58) Field of Search .................. 345/163, 156, 345/166, 161, 157; 341/175; 356/373

(56) References Cited

U.S. PATENT DOCUMENTS

| | | | |
|---|---|---|---|
| 5,313,229 A | * 5/1994 | Gilligan et al. | 345/157 |
| 5,530,455 A | 6/1996 | Gillicj et al. | 345/163 |
| 5,666,138 A | * 9/1997 | Culver | 345/161 |
| D385,554 S | 10/1997 | Kaneko et al. | D14/114 |
| 5,771,038 A | * 6/1998 | Wang | 345/163 |
| 5,883,619 A | 3/1999 | Ho et al. | 345/163 |
| 5,883,718 A | * 3/1999 | Shu-Ming | 356/373 |
| 6,104,334 A | * 8/2000 | Allport | 341/175 |
| 6,166,721 A | * 12/2000 | Kuroiwa et al. | 345/163 |
| 6,204,838 B1 | * 3/2001 | Wang et al. | 345/161 |
| 6,232,959 B1 | * 5/2001 | Pedersen | 345/161 |

* cited by examiner

Primary Examiner—Richard Hjerpe
Assistant Examiner—Kevin M. Nguyen
(74) Attorney, Agent, or Firm—Perkins Coie LLP

(57) ABSTRACT

A mouse is provided with a slider which is used to control the scrolling of an image on a computer screen. The slider is preferably movable in two opposing directions from a rest position with the direction and amount of movement of the slider controlling the direction and rate of image scrolling.

47 Claims, 5 Drawing Sheets

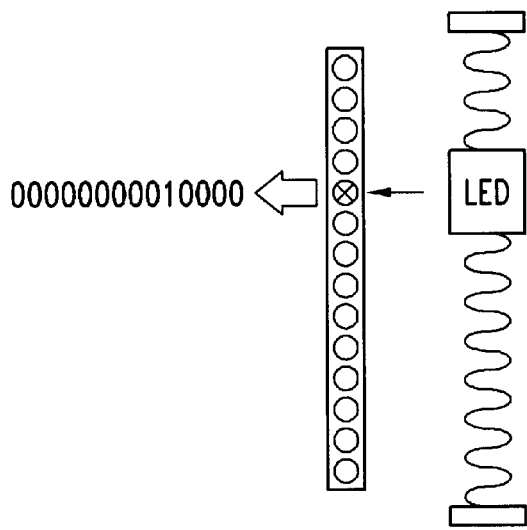
*Fig. 5*
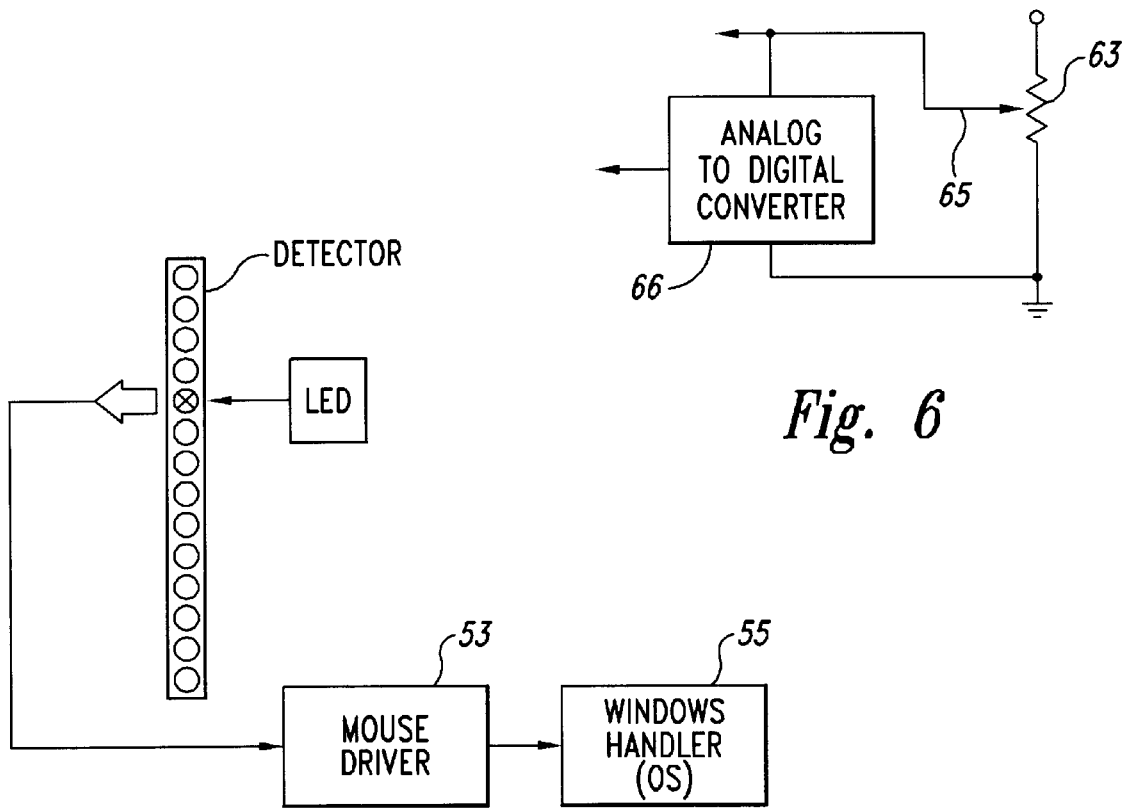
*Fig. 6*
*Fig. 7*

MOUSE WITH SLIDER CONTROL FOR COMPUTER SCROLLING

FIELD OF THE INVENTION

The present invention relates to a computer mouse for entering data into a computer and more particularly to a computer mouse which has a slider control which regulates the scrolling of an image on a display screen of a computer.

BACKGROUND OF THE INVENTION

The ubiquitous computer mouse has considerably enhanced the productivity of computer users. The functions and operations of a computer mouse are well known in the art and will not be repeated herein. However, some control functions of the computer which the mouse is capable of performing require conjunctive action such as the operation of a selection switch on the mouse coupled with movement of the mouse (so called drag and drop function) in order to scroll or move images on a computer screen. This conjunctive action is sometimes awkward for novice computer users or small children. Accordingly, efforts have been made to simplify the operations which a user is required to perform in order to have the mouse perform a scrolling operation.

Once such effort is disclosed in U.S. Pat. No. 5,530,455. This patent discloses a computer mouse having a roller ball thereon which is operable by a computer user to scroll a display image. However, a roller can be continued to be rotated far beyond a desired scrolled image on the screen thus potentially providing an incorrect or awkward scrolling function for a user. Accordingly, a simplified mechanism for scrolling a computer image would be desirable.

SUMMARY OF THE INVENTION

The invention provides a simplified mechanism for scrolling a mouse which employs a slider which slides along a body of a mouse and which is easily maneuvered by a finger of a user to scroll an image and without requiring a conjunctive operation of a selection switch and movement of the mouse body.

The slider, which moves relative to the mouse body, provides data signals representing the amount of movement of the slider relative to the mouse body as well as a direction of movement of the slider. This data is in turn provided to a mouse driver which interprets the data and provides scrolling data to an operating system of the computer which controls image scrolling.

With the invention a user merely needs to move the slider in a first or second direction to control scrolling in an upward or downward direction and can control the rate of scrolling by the amount of movement of the slider from its rest position.

These and other advantages and features of the invention will be more readily understood from the following detailed description of the invention which is provided in connection with the accompanying drawings.

BRIEF DESCRIPTION OF THE DRAWINGS

FIG. 5 illustrates an optical system which may be used in the invention to provide signals representing the movement of the slider;

FIG. 6 illustrates another circuit employing variable resistance for providing signals representing the movement of the slider;

FIG. 7 illustrates the input of signals representing the slider movement to a mouse driver and in turn to a windows handler;

DETAILED DESCRIPTION OF THE INVENTION

Figure 1:
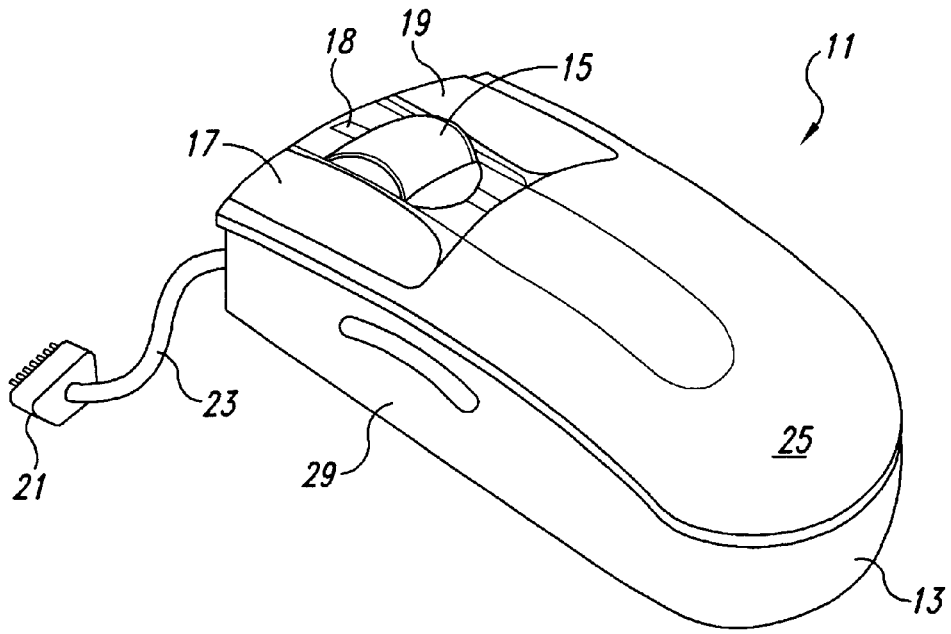
FIG. 1 illustrates a mouse incorporating the invention.

FIG. 1 illustrates an embodiment of the invention in which a mouse 11 is shown as having a mouse body 13, conventional selection switches 17 and 19 and an upper surface 25 thereof and a slider 15 which is labeled to slide back and forth in a slot 18 provided in the upper surface 25 in a forward and backward direction. A cord 23 exits the mouse as is conventional and terminates in a connector plug 21 which is adapted to be inserted into an input/output port of a computer.

Figure 2:
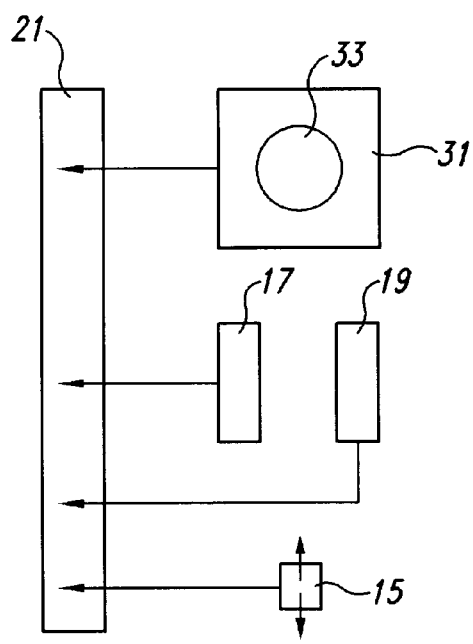
FIG. 2 illustrates output signals produced by the mouse which are supplied to a computer.

The mouse has a conventional mouse movement detector 31 and its undersurface (FIG. 2) including a roller ball 33 which provides the usual signals to a computer upon movement of the mouse across a surface. In addition, as shown in FIG. 2 the mouse also has the conventional signal outputs attended selection switches 17 and 19. Finally, the mouse is also provided with additional output signal as shown in FIG. 2 which is generated based on movement of the slider 15 in the forward and reverse direction.

Figure 3:
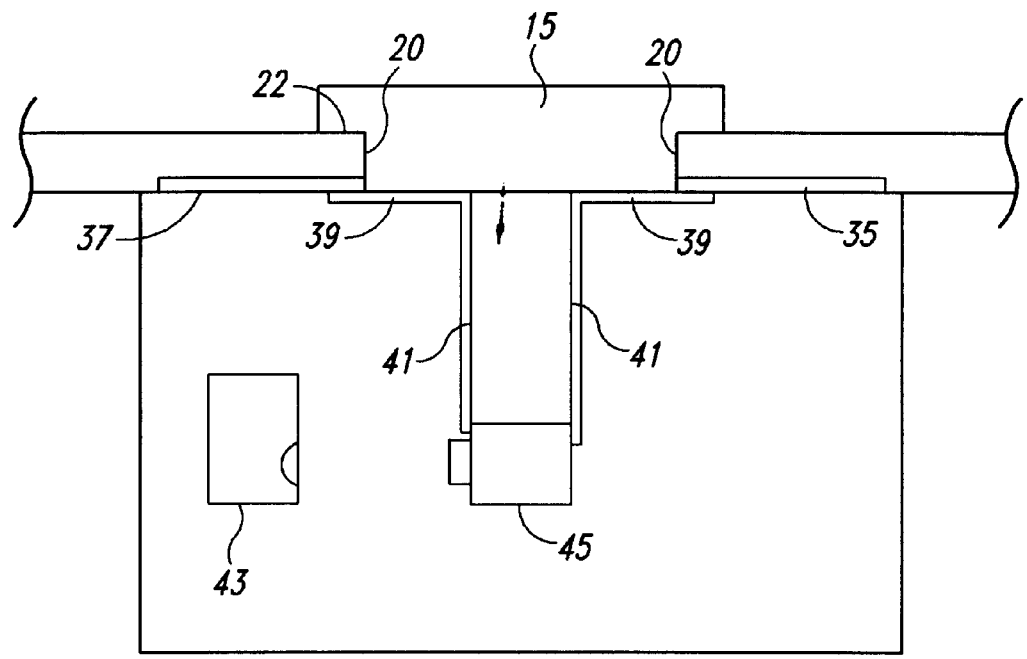
FIG. 3 illustrates in schematic form the mechanical connection of the slider to the mouse body as well as the matter of generating control signals representing slider movement.
Figure 4:
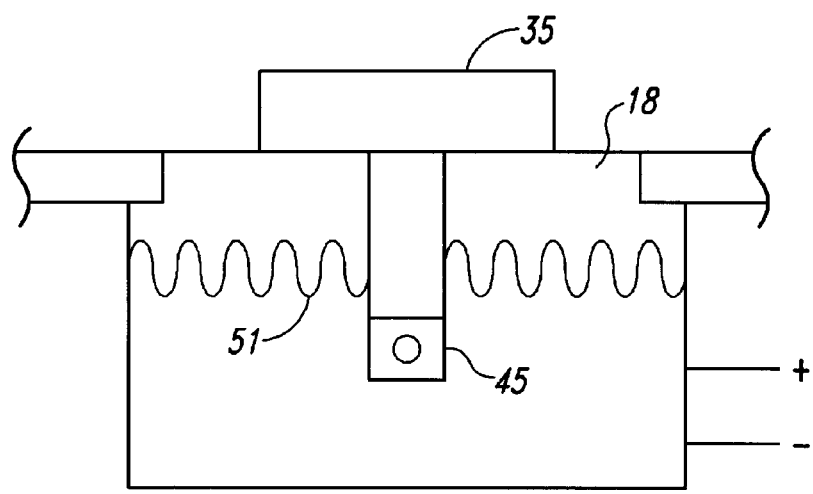
FIG. 4 illustrates the matter in which the slider illustrated in other drawings is biased to a rest position.

The slider is preferably biased to a rest position approximately midway of the longitudinal direction of slot 18 by a biasing mechanism, shown as a pair of springs 51 which are respectively connected to a downward extension from slider 35 and which are respectively anchored to the mouse body at a point near the opposite ends of the slot 18. The downward projection of the slider 35 terminates at light emitter 45 which emits a narrow beam of focus light towards a light detector array 43, as best shown in FIGS. 3, 5, 7 and 10. Power for energizing the light emitter 45, which may be an LED, or a laser diode, is provided by respective conductors 41 and 39 which are provided on the downward projection of slider 15 and extend along its undersurface and connect with corresponding conductors provided adjacent sidewalls 20 of the slot (FIG. 3). These slot conductors 35 and 37 respectively connect with a power source providing power to the mouse from a computer. As well known, power is applied to the mouse from the computer when the computer is operating and is supplied through connector 21. As best illustrated in the sectional top view of FIG. 5, as the slider 15 is moveable in a forward and aft direction the light emitter 45 moves along a path where it selectively illuminates one of the plurality of light detectors provided in a light detector array 43. Thus, the direction of movement of the slider as well as the amount of movement of the slider from a rest position can be registered by the light detector array 43. The output from the light detector array which can be in the form of a digital signal is supplied, as shown in FIG. 7 to the input of a mouse driver 53 which in turn provides control data into a windows handler 55 which is part of the operating system of a computer. Consequently, as slider 15 moves fore and aft relative to the mouse body 13 signals are provided by the detector array 43 to the mouse driver 53 as inputs to the mouse driver 53 which in turn provides the control data to the windows handler 55 instructing the windows handler to scroll a computer image or object up or down and at what rate. In the invention the rate is controlled by the amount of movement of the slider relative to the amount body that is, the farther the slider 15 is moved from its rest position the faster the mouse driver 53 instructs the window handler 55 to scroll the image or object.

Figure 8:
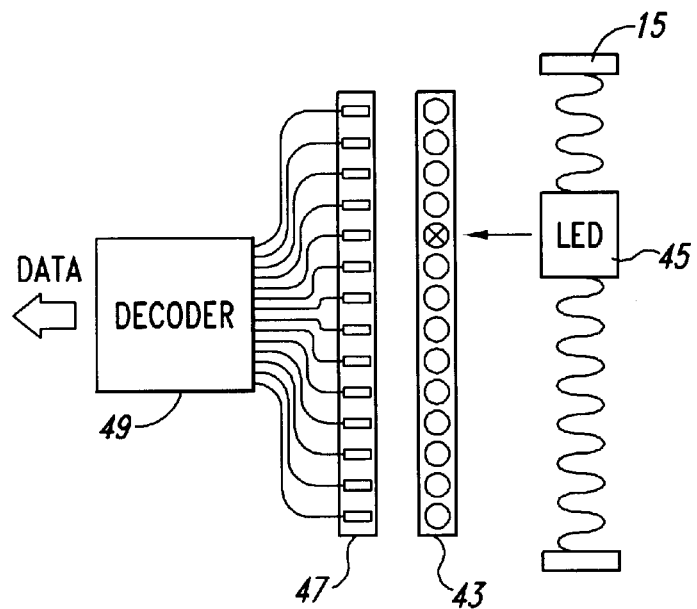
FIG. 8 illustrates a variant of the invention illustrated in FIG. 5.

FIG. 8 illustrates a variation of a signal generator for the slider 15 in which the array of light detectors 43 is connected to an array of threshold devices 47. The threshold devices serve to sharpen the output signals from each of the light sensors in the detector array 43 and the output of the threshold array 47 can be supplied either directly or through a suitable decoder 49 as data to a computer.

Figure 9:
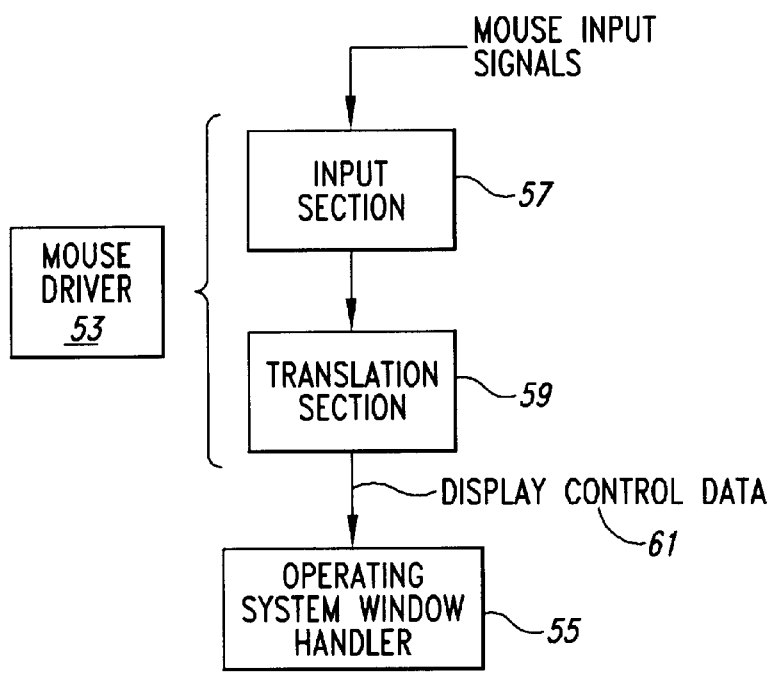
FIG. 9 illustrates the data flow from the mouse through the mouse driver to an operating system of the computer.
Figure 10:
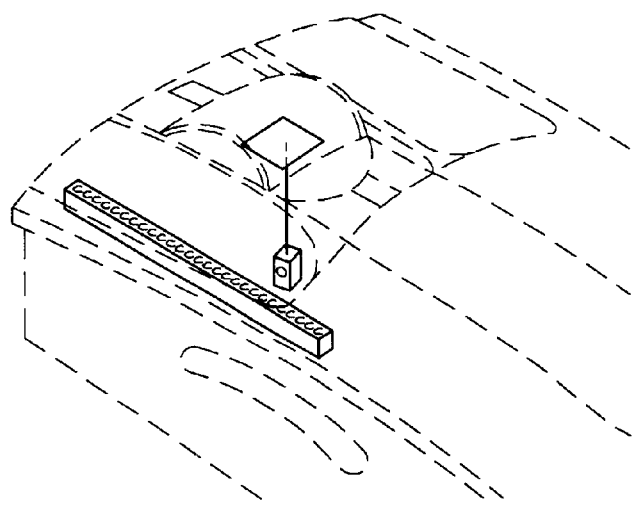
FIG. 10 further illustrates the relationship of the slider to a light detector array.

The slider movement signals generated by the light detector array 43 are provided at the computer connector 21 where the computer takes the slider movement signals and applies them to the mouse driver 53 which is operating within the computer. The mouse driver receives the input signals which represent both the direction of movement of the slider as well as the amount the slider has moved from its rest position and translates those input signals into control data for the windows to handler 25. The windows handler is provided in the operating system of the computer and manages the software module which manages a display image on the computer within an open window. The data from the mouse driver tells the window handler in what direction to scroll the displayed image and at what rate the rate corresponding to the amount of movement of the slider from its rest position (FIG. 9).

Although the invention has been illustrated with a signal generator operating under optical principles to provide the data representing the direction and degree of movement of the slider 15 and also possible to use other mechanisms for determining the direction and degree of movement of slider 15. For example, FIG. 6 illustrates an embodiment in which a variable resister 63 is provided as a stationary element and a moveable portion 65 of the variable resistance is provided to move in conjunction with movement of both in direction and amount of slider 15. The variable resister is included in a circuit which is effected by the variations and resistance both in direction and magnitude caused by movement of the slider 15 and the output of the circuit is applied to an analog to digital converter which applies input signals to the mouse driver once again indicating both the direction of movement of the slider as well as the degree or amount of movement. Other methodologies for generating the input signals to the mouse driver 53 will also readily occur to those of ordinary skill in the art.

It should be noted that in the optical embodiments illustrated in FIGS. 5 and 8 that although the light emitter 45 has been provided to move in conjunction with the slider passed the light detector array 43 which is stationary it is also possible to reverse the roles of these two elements such that the detector array moves in conjunction with movement of the slider 15 while the light emitter 45 remains stationary. In addition, although FIG. 3 illustrates that the slider 15 has recesses 22 on each side thereof for engaging with sidewalls 20 of a slot 18 provided in the upper surface 25 of the mouse body 13, it is also possible to have many other configurations which will allow slider 15 to slide relative to the mouse body 13.

As noted above, the present invention provides a mouse which has a slider which is capable of controlling the scrolling function of a computer by movement of a slider from a rest position in a forward and backward position with the direction of movement and the amount of movement of the slider controlling the direction of scrolling and the rate of scrolling at the computer. In addition, although the invention has been illustrated with respect to having a slider biased to a middle position in its movement path it is also possible to bias the slider at other positions and to also provide a logrhythmic or other non-linear function into the slider movement. These functions could be built either in the mouse itself or in the mouse driver 53 software. It is also possible to have the slider only move in a single direction from a rest position and use one of the selector switches 17 and 19 to control the direction of scrolling if desired.

Figure 11:
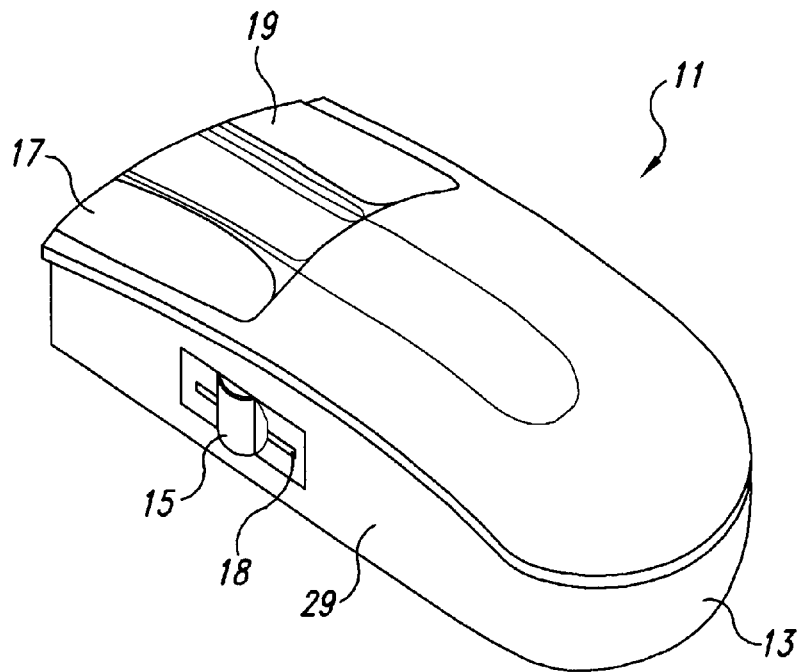
FIG. 11 illustrates yet another variant of the invention.

Another variation of the invention is illustrated in FIG. 11 wherein the slider 15 is positioned on the side of side 29 of the mouse body 13 for operation by a user's thumb. In the embodiments illustrated in FIGS. 1–9 the slider is positioned on the upper surface and would normally be operated by a user's index finger.

While the invention has been described and illustrated with respect to exemplary embodiments, it should be understood that many modifications can be made to the invention within the spirit and scope of the invention. Numerous substitutions of equivalents can be made to the structures described and illustrated above without departing from the scope of the invention. Accordingly, the invention is not limited by the foregoing description, it is only limited by the scope of the appended claims.

What is claimed as new and desired to be protected by Letters Patent of the United States is:

1. A computer mouse comprising:
   a body having a movement detector, said movement detector generating mouse movement signals relative to a first axis and a second axis normal to the first axis;
   at least one selection switch mounted on said body, said selection switch providing a selection signal upon actuation; and
   a slider provided on said mouse body, said slider being moveable relative to said body and having an associated signal generator which generates signals representing the sliding movement of said slider, the signal generator including:
      a stationary member, the stationary member including one of a light source and a light detector; and
      a moveable member coupled for movement with said slider, the moveable member including the other of said light source and said light detector, wherein the signal generator produces output signals which change in response to movement of said moveable member relative to said stationary member.

2. A mouse as in claim 1, wherein said slider is provided on an upper surface of said body.

3. A mouse as in claim 1, wherein said slider is provided on a side surface of said body.

4. A mouse as in claim 1, wherein said slider is provided on one side of said selection switch.

5. A mouse as in claim 4, wherein said mouse comprises two selection switches and said slider is provided between them.

6. A mouse as in claim 1, wherein said light detector comprises a plurality of light sensors and said light source comprises a device for emitting a light beam, said plurality of light sensors being arranged relative to said light source such that different ones of said light sensors receive said light beam depending upon the amount of movement of said slider.

7. A mouse as in claim 1, further comprising a biasing structure which biases said slider toward a rest position on said mouse body.

8. A mouse as in claim 7, wherein said biasing structure includes biasing springs which bias said slider toward said rest position.

9. A mouse as in claim 7, wherein said slider is moveable from said rest position along said body in two opposing directions.

10. A mouse as in claim 9, wherein said signal generator generates signals which represent the amount of movement of said slider from said rest position and the direction of movement of said slider.

11. A mouse as in claim 10, wherein said mouse comprises two selection switches and said slider is provided between them.

12. A mouse as in claim 1, wherein said signal generator produces an analog signal.

13. A mouse as in claim 1, wherein said signal generator produces a digital signal.

14. A mouse as in claim 1, further comprising a computer connector having electrical terminals, said connector providing said mouse movement signals, said selection signal, and said slider movement signals at said terminals.

15. A method of controlling scrolling of a display image on a computer screen comprising:
    slidably moving a slider on a mouse body to generate signals representing said slider movement, said slider movement signals being generated by moving a moveable member relative to a stationary member, the moveable member including one of a light source and a light detector and the stationary member including the other of said light source and said light detector; and
    scrolling a display image on a computer screen in response to said slider movement signals.

16. A method as in claim 15, including slidably moving said slider from a rest position relative to said mouse body in one of two different directions and scrolling said computer screen in one of two different directions in accordance with the direction of movement of said slider.

17. A computer system comprising:
    a computer having a mouse input port, and a mouse connectable to said input port, said mouse comprising:
        a body having a movement detector, said movement detector generating mouse movement signals relative to a first axis and a second axis normal to the first axis;
        at least one selection switch mounted on said body, said selection switch providing a selection signal upon actuation; and
        a slider provided on said mouse body, said slider being moveable relative to said body and having an associated signal generator which generates signals representing the sliding movement of said slider, the signal generator including:
            a stationary member, the stationary member including one of a light source and a light detector; and
            a moveable member coupled for movement with said slider, the moveable member including the other of said light source and said light detector, wherein the signal generator produces output signals which change in response to movement of said moveable member relative to said stationary member.

18. A computer system as in claim 17, wherein said slider is provided on an upper surface of said body.

19. A computer system as in claim 17, wherein said slider is provided on a side surface of said body.

20. A computer system as in claim 17, wherein said slider is provided on one side of said selection switch.

21. A computer system as in claim 20, wherein said mouse comprises two selection switches and said slider is provided between them.

22. A computer system as in claim 17, wherein said light detector comprises a plurality of light sensors and said light source comprises a device for emitting a light beam, said plurality of light sensors being arranged relative to said light source such that different ones of said light sensors received said light beam depending upon the amount of movement of said slider.

23. A computer system as in claim 17, further comprising a biasing structure which biases said slider toward a rest position on said mouse body.

24. A computer system of claim 23, wherein said biasing structure includes biasing springs which bias said slider toward said rest position.

25. A computer system as in claim 23, wherein said slider is moveable from said rest position along said body in two opposing directions.

26. A computer system as in claim 25, wherein said signal generator generates signals which represent the amount of movement of said slider from said rest position and the direction of movement of said slider.

27. A computer system as in claim 26, wherein said mouse comprises two selection switches and said slider is provided between them.

28. A computer system as in claim 17, wherein said signal generator produces an analog signal.

29. A computer system as in claim 17, wherein said signal generator produces a digital signal.

30. A computer system as in claim 17, further comprising a computer connector having electrical terminals, said connector providing said mouse movement signals, said selection signal, and said slider movement signals at said terminals.

31. The computer system of claim 17, further comprising:
    a storage medium storing a program for operating the computer, said program comprising:
    an input section for receiving input data representing the movement of the slider on the mouse; and
    a section for translating said input data into control data for controlling the scrolling of a computer display image.

32. The storage medium of claim 31, wherein said storage medium is a RAM.

33. The storage medium of claim 31, wherein said storage medium is a ROM.

34. The storage medium of claim 31, wherein said storage medium is a hard drive.

35. The storage medium of claim 31, wherein said storage medium is a floppy disk.

36. The storage medium as in claim 31, wherein said input section receives input data representing the direction of movement of said slider and said translation section provides corresponding control data which controls the scrolling of said computer display image in an associated direction.

37. The storage medium as in claim 36, wherein said input section receives input data representing the direction of movement of said slider and said translation section provides corresponding control data which controls the scrolling of said computer display image in an associated direction.

38. The storage medium as in claim 31, wherein said input section receives input data representing the amount of movement of said slider from a rest position and said translation section translates said input data into control signals for controlling the rate of scrolling of a computer display image, such that the rate of scrolling corresponds to the amount of movement of said slider from a rest position.

39. A computer mouse comprising:
a body having a movement detector, said movement detector generating mouse movement signals relative to a first axis and a second axis normal to the first axis;
at least one selection switch mounted on said body, said selection switch providing selection signal upon actuation; and
a slider provided on said mouse body, said slider being moveable relative to said body and having an associated signal generator which generates signals representing the sliding movement of said slider, the signal generator including:
 a stationary member, the stationary member including one of a light source and light detector; and
 a moveable member coupled for movement with said slider, the moveable member including the other of said light source and said light detector, wherein the signal generator produces output signals which change in response to movement of said moveable member relative to said stationary member, further wherein said output signals scroll a display image on a computer screen in response to said slider movement.

40. A computer system comprising:
a computer having a mouse input port; and
a mouse connectable to said input port, said mouse comprising:
a body having a movement detector, said movement detector generating mouse movement signals relative to a first axis and a second axis normal to the first axis;
at least one selection switch mounted on said body, said selection switch providing a selection signal upon actuation; and
a slider provided on said mouse body, said slider being moveable relative to said body and having an associated signal generator which generates signals representing the sliding movement of said slider, the signal generator including:
 a stationary member, the stationary member including one of a light source and a light detector; and
 a moveable member coupled for movement with said slider, the moveable member including the other of said light source and said light detector, wherein the signal generator produces output signals which change in response to movement of said moveable member relative to said stationary member, further wherein said output signals scroll a display image on a computer screen in response to said slider movement.

41. A method of controlling a computer, the method comprising:
slidably moving a slider on a mouse body to move one of a light source and a light detector relative to the other of the light source and the light detector;
in response to the movement of the one of the light source and the light detector relative to the other of the light source and the light detector, generating signals representing the slider movement;
transmitting the signals to the computer; and
controlling the computer in response to the transmitted signals.

42. A computer mouse usable on a surface, the computer mouse comprising:
a body slidable on the surface, the body having a movement detector that generates m use movement signals relative to a first axis and a second axis normal to the first axis in response to movement of the body on the surface;
at least one selection switch mounted on said body, the selection switch providing a selection signal upon actuation; and
a slider provided on the mouse body, the slider being moveable relative to the body and having an associated signal generator that generates signals representing the sliding movement of the slider, the signal generator including:
 a stationary member within the body, the stationary member including on e of a light source and a light detector; and
 a moveable member within the body, the moveable member coupled for movement with the slider and including the other of the light source and the light detector, wherein the signal generator produces output signals that change in response to movement of the moveable member relative to the stationary member.

43. A computer mouse useable on a surface, the computer mouse comprising:
a body slidable on the surface, the body having an undersurface;
a movement detector adjacent to the undersurface of the body, the movement detector including a roller ball that generates mouse movement signals relative to a first axis and a second axis normal to the first axis in response to movement of the body on the surface;
at least one selection switch mounted on the body, the selection switch providing a selection signal upon actuation; and
a slider provided on the mouse body, the slider being moveable relative to the body and having an associated signal generator that generates signals representing the sliding movement of the slider, the signal generator including:
 a stationary member within the body, the stationary member including one of a light source and a light detector; and
 a moveable member within the body, the moveable member coupled for movement with the slider and including the other of the light source and the light detector, wherein the signal generator produces output signals that change in response to movement f the moveable member relative to the stationary member.

44. A method for providing movement signals to a computer, the method comprising:
moving a mouse body on a surface to generate first movement signals representing the body movement relative to a first axis and a second axis normal to the first axis; and slidably moving a slider on the mouse body to generate second movement signals representing the slider movement, the slider movement signals being generated by moving a moveable member within the body relative to a stationary member within the body, the moveable member including one of a light source and a light detector and the stationary member including the other of the light source and the light detector.

45. The method of claim 44 further comprising scrolling a display image on a computer screen in response to the second movement signals.

46. The method of claim 44 wherein moving a mouse body across a surface includes moving a mouse body having a movement detector, the movement detector including a roller ball that generates the first movement signals in response to movement of the mouse body across the surface.

47. A computer system comprising:
   a computer having a mouse input port; and
   a mouse connectable to the input port, the mouse comprising:
      a body slidable on a surface, the body including an undersurface;
      a movement detector adjacent to the undersurface of the body, the movement detector including a roller ball that generates mouse movement signals relative to a first axis and a second axis normal to the first axis in response to movement of the body on the surface;
      at least one selection switch mounted on the body, the selection switch providing a selection signal upon actuation; and
      a slider provided on the mouse body, the slider being moveable relative to the body and having an associated signal generator that generates signals representing the sliding movement of the slider, the signal generator including:
         a stationary member within the body, the stationary member including one of a light source and a light detector; and
         a moveable member within the body, the moveable member coupled for movement with the slider and including the other of the light source and the light detector, wherein the signal generator produces output signals which change in response to movement of the moveable member relative to the stationary member.

\* \* \* \* \*

UNITED STATES PATENT AND TRADEMARK OFFICE
CERTIFICATE OF CORRECTION

PATENT NO.    : 6,496,180 B1
DATED         : December 17, 2002
INVENTOR(S)   : Hedman It is certified that error appears in the above-identified patent and that said Letters Patent is hereby corrected as shown below:

<u>Title page,</u>
Item [56], References Cited, U.S. PATENT DOCUMENTS, "D385,554" should be -- D385,542 --;

<u>Column 3,</u>
Line 32, delete "to" between "windows" and "handler";

<u>Column 7,</u>
Line 19, insert -- a -- between "providing" and "selection";
Line 27, insert -- a -- between "and" and "light";

<u>Column 8,</u>
Line 11, "m use" should be -- mouse --;
Line 59, "f" should be -- of --;

Signed and Sealed this

Twenty-fourth Day of June, 2003

JAMES E. ROGAN
*Director of the United States Patent and Trademark Office*